No. 853,415. PATENTED MAY 14, 1907.
M. MEAD.
HAY BALING DEVICE.
APPLICATION FILED APR. 24, 1906.

Witnesses. Inventor.

UNITED STATES PATENT OFFICE.

MARVIN MEAD, OF PUEBLO, COLORADO.

HAY-BALING DEVICE.

No. 853,415.

Specification of Letters Patent.

Patented May 14, 1907.

Application filed April 24, 1906. Serial No. 313,366.

*To all whom it may concern:*

Be it known that I, MARVIN MEAD, residing at Pueblo, in the county of Pueblo and State of Colorado, have invented certain new and useful Improvements in Hay-Baling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in hay balers, or especially to the form and location of the levers and manner of transmitting the power from the lever horse power to the plunger of the baler.

One object in this device is to provide a baler that the bale chamber can remain on the transporting wheels while in operation far enough above the ground or floor for the push and pull bar or cable, and the bridge plank to be underneath the said bale chamber and axles and nearly flat on the ground in line with a low down horsepower, making said power connection without any obstruction for the team to pass over.

Another object in this device is to apply the power to the center pressure of the plunger, without any pitman, cam, jointed lever or any other cumbersome and heavy fixtures or connections, applying the power direct, so there can be no trouble from buckling or springing up of the bridgeplank or pushbar.

A still further object is to provide a baler that is strong and durable with less weight, shorter, less number of parts, easy to transport and operate, and that can be set with one end or either side of the feed hopper to the stack.

Figure 1:
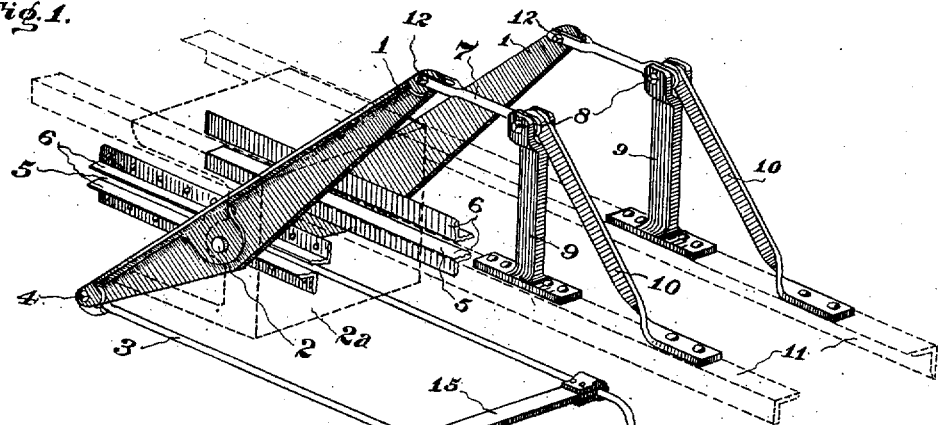
Figure 3:
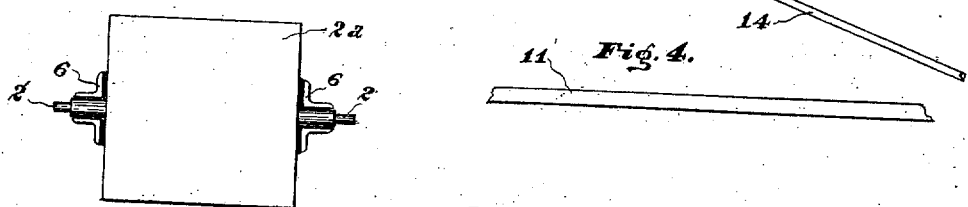
Figure 4:
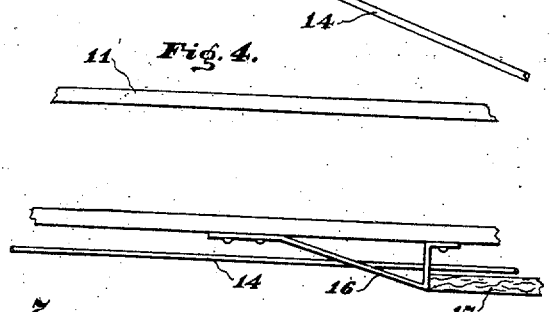
Figure 2:
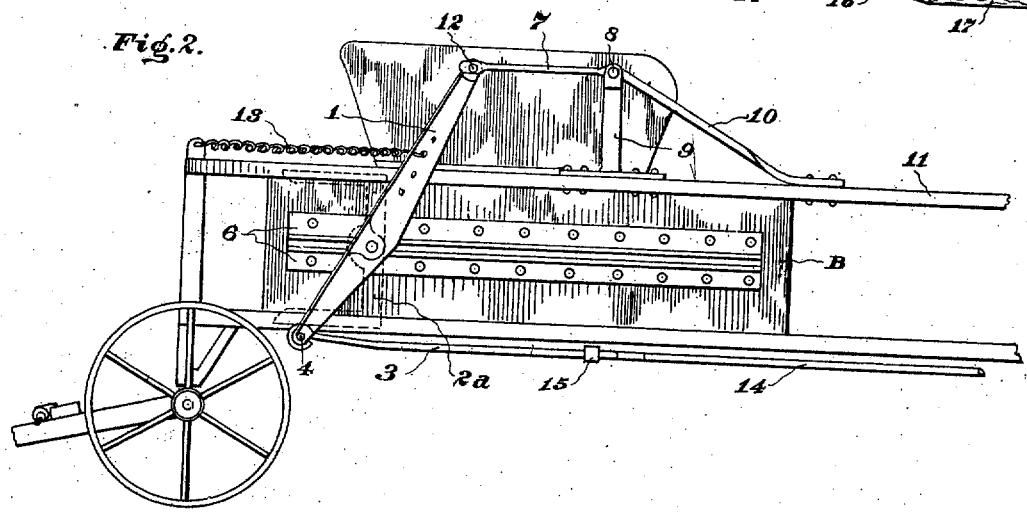

In the drawings forming a part of this specification, Figure 1 is a perspective view of the parts of a baling press constructed in accordance with my invention. Fig. 2 is a side view showing the position of vertical side levers, as applied to an ordinary bale chamber. Fig. 3 is a front elevation of the plunger shown by dotted lines in Figs. 1 & 2. Fig. 4 is a view of a depending bracket or brace to support the bridge or push plank, between the power and bale chamber.

B Fig. 2, is a side plates of the bale chamber, dotted lines showing the sliding plunger 2A.

2 & 2, Fig. 3, are portions of 2A, in the form of lugs, extending out on either side.

The side plates B are divided or slotted at 5, Fig. 1, and made strong by bars 6—6, forming ways and guides for the lugs 2, of the plunger 2A, to travel in.

The lugs 2—2, are the central moving fulcrums for the vertical levers 1—1, and hold them in place, as they force the plunger forward to press the bale.

7 is a link pivoted at 8, to post 9, and brace 10, and also to the upper end of lever 1 at 12, forming a rigid horizontal fulcrum and permitting a vertical movement, sufficient to carry the central pivot of the lever, in the parallel slot of the side plate. The pull rod or cable 14, is divided under the press and held so by the spreader 15, the prongs 3, are pivoted to the levers 1—1, at 4, and the single end to the low down power. The return spring 13, is adjustable and can be hooked to the lever at any place to give the plunger more or less help to return.

In Fig. 4,—16 is a double bracket fastened and braced to the sills of the bale chamber, depending down to support the bridge or push plank 17, and low enough for the pull rod 14 or a cable to pass or slide over or above the plank. There is an opening in the bracket 16, to allow the rod 14 to pass through over the bridge 17. The bridge plank 17 is movable, and when the baler is in operation the plank is placed between the horsepower and the press, to counteract the pull of the rod, or as a brace to prevent the power and press from being drawn toward each other.

It will thus be seen that I provide a baler that is light and strong, that can remain on the trucks while in operation, with light movable and flexible connections, under the press and flat to the ground for the team to pass over.

Having thus fully described my invention, what I claim as new and desire to secure by Letters Patent is—

1. In combination, a bale chamber having slots in its sides, guide plates arranged adjacent the slots, a plunger within the chamber, trunnions on the plunger extending through the slots between the guides, levers mounted on the trunnions of the plunger, links pivoted to the upper ends of the levers, said links being carried by the chamber, and pull rods connected to the opposite ends of the levers.

2. In combination, a bale chamber having slots in its sides, guide plates arranged adjacent the slots, a plunger within the chamber, trunnions on the plunger extending through the slots between the guides, levers mounted on the trunnions of the plunger, links pivoted to the upper ends of the levers, said links being carried by the chamber, pull rods connected to the opposite ends of the lever, and a spreader engaging the pull rods.

In testimony whereof, he affixes his signature, in presence of two witnesses:

MARVIN MEAD.

Witnesses:
H. M. TURNER,
WILLIAM WOOD.